United States Patent Office 3,441,832
Patented Apr. 29, 1969

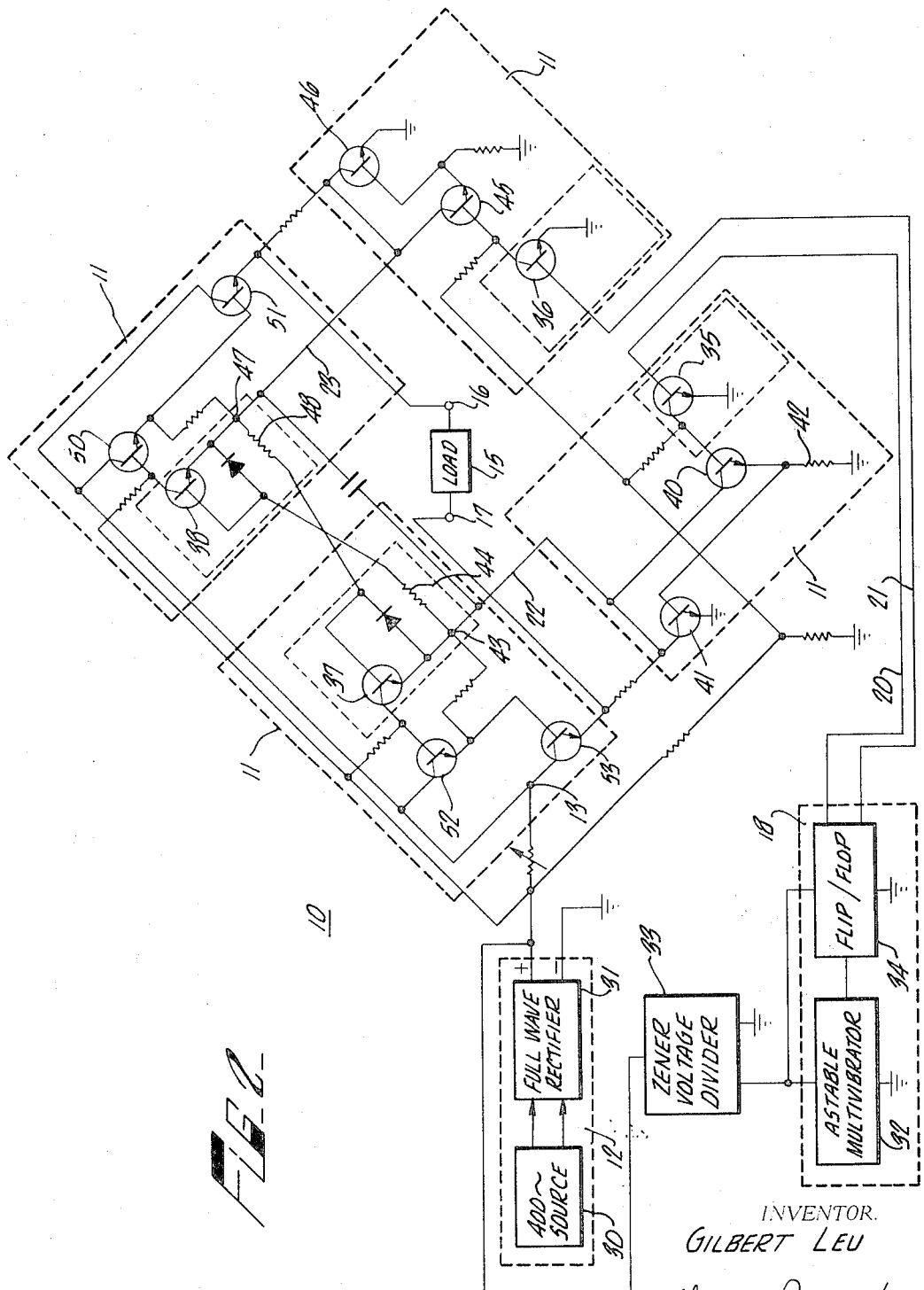

3,441,832
TRANSISTOR DIRECT CURRENT TO ALTERNATING CURRENT CONVERSION CIRCUIT
Gilbert Leu, Los Angeles, Calif., assignor to Ex-Cell-O Corporation, Hawthorne, Calif., a corporation of Michigan
Filed May 29, 1967, Ser. No. 642,015
Int. Cl. H02m 7/52
U.S. Cl. 321—45                                5 Claims

ABSTRACT OF THE DISCLOSURE

The present invention is directed to an all solid state direct current to alternating current conversion circuit. The conversion is effected by means of a bridge network having a pair of power transistors arranged in a complementary fashion in each arm of the bridge network. The complementary pair are alternately rendered conductive for defining alternating current paths through the bridge network to load terminals.

---

Figure 1:
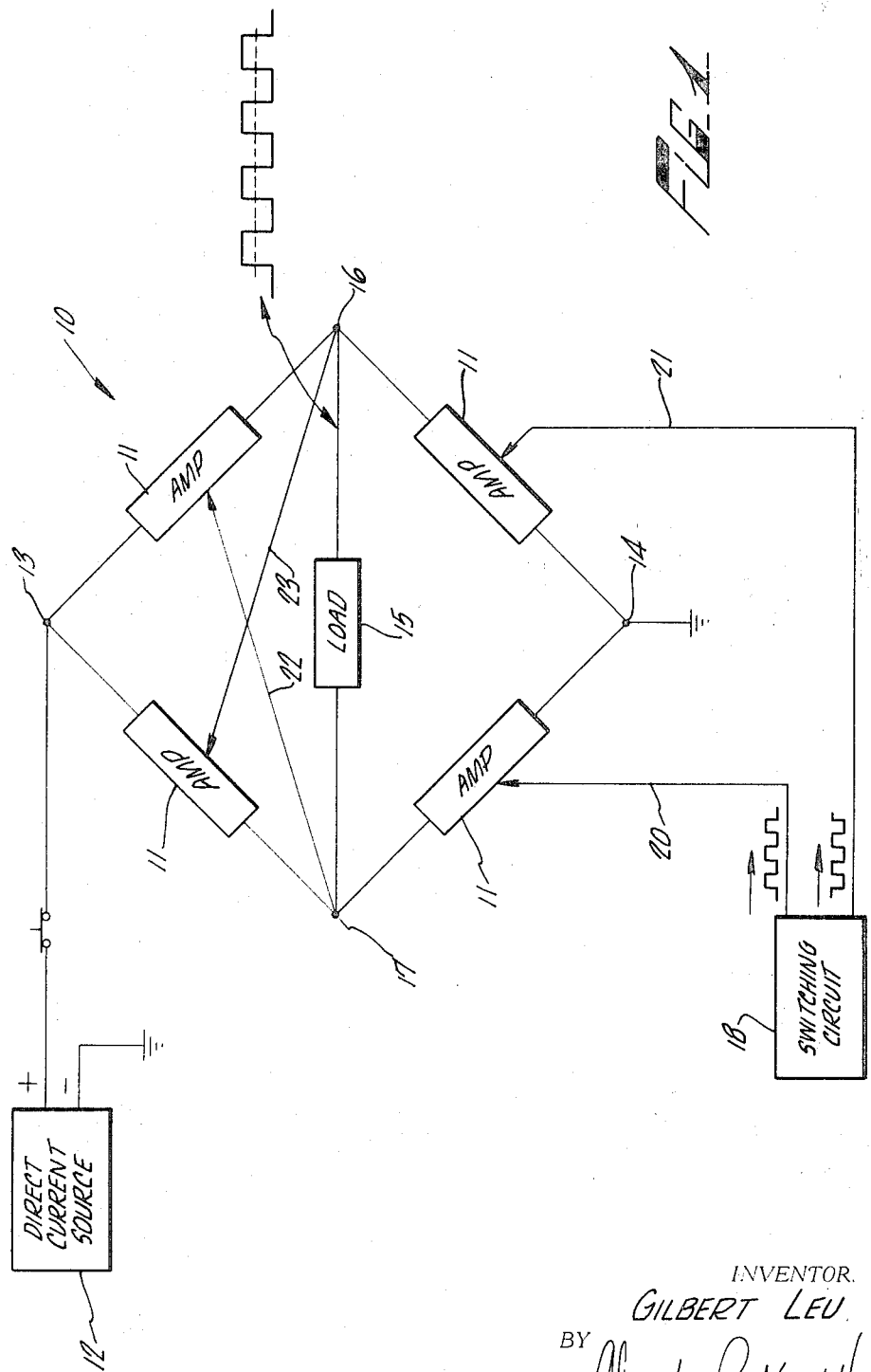

This invention relates to an electronic converter and more particularly to direct current to alternating current conversion circuits.

Circuit arrangements for converting direct current to alternating current are well known in the art. At the present time these D.C. to A.C. converting currents generally employ a transformer in the conversion circuit. In addition, some of the circuits that employ transformers require that the transformer have a center tap to cause the alternating current generated in the conversion circuits to be properly coupled to the load. It should therefore be appreciated that the requirement for a transformer and in particular a transformer having a center tap is disadvantageous both from the standpoint of the cost of the transformer and the requirement of the center tap for proper current conversion. This requirement for a transformer also increases the size and weight of the conversion circuit.

The present invention provides an improved, completely solid state direct current to alternating current converting circuit that is smaller in size and weight than circuits of this type heretofore known. The conversion circuit of the present invention eliminates the requirement for a transformer and, therefore, the power, weight and size of the conversion circuit is substantially reduced from prior art circuits. The ouput alternating current derived from the conversion circuit of the present invention can also be readily adjusted and provides a stable output frequency for any one adjustment. The conversion circuit is further adaptable for use with any alternating current system, 60 cycle systems, 50 cycle systems, or 400 cycle systems, when employed with the conversion circuit of the present invention to convert to any other desired system frequency or to drive elements of the system designed for operating other than at the system frequency. For example, in 400 cycle systems, it may be necessary to drive a 60 cycle motor and the employment of the conversion circuit of the present invention allows this to be readily accomplished without altering the system as a whole.

From a structural standpoint, the present invention broadly comprehends a switching bridge circuit connected to be responsive to a direct current source and to provide an alternating current output. For this purpose each arm of the bridge network includes an amplifying means arranged in diagonally opposite arms of the bridge network that are defined in a complementary conductive relationship to cause their conductive conditions to be simultaneously controlled. The alternating current output is derived from the bridge network at the diagonally opposite terminals of the bridge network from those at which the D.C. source is applied. The conductive conditions of the amplifier circuits of the bridge network are controlled through a bistable switching circuit to alternately cause the complementary pair of amplifiers to be rendered conductive and nonconductive and thereby define alternating current paths by means of the conductive arms of the bridge network through the load terminals. The amplifier circuits may be transistor amplifiers such as the transistors arranged in the conventional Darlington configuration to cause the alternate conductive and nonconductive conditions. The switching circuit for controlling the conductive conditions include an astable multivibrator for controlling the conductive and nonconductive conditions of the complementary pair of amplifiers and thereby the output frequency from the conversion circuit.

These and other features of the present invention may be more fully appreciated when considered in the light of the following specification and drawings, in which:

FIG. 1 is a general block diagram of the direct current to alternating current conversion circuit embodying the present invention; and FIG. 2 is a block-schematic diagram of the conversion circuit of FIG. 1.

Now referring initially to FIG. 1, a detailed examination of the direct current to alternating current conversion circuit 10 will be described. The conversion circuit 10 comprises a bridge network having an amplifier 11 arranged in each arm of the bridge network. A direct current source 12 is coupled to the diagonally opposite terminals 13 and 14 of the bridge network. The remaining pair of diagonally opposite terminals of the network are connected to a load shown as the block 15 directly coupled to the output terminals 16 and 17. The amplifying means 11 are arranged in pairs in a complementary conductive fashion and for this purpose are ararnged in diagonally opposite arms of the bridge network to cause them to be conductively controlled substantially simultaneously. The conductive conditions of the amplifiers 11 are controlled through the provision of the switching circuit 18. The switching circuit 18 is a bistable circuit having its bistable outputs coupled to at least one of each of the amplifiers of the pair of complementary pair of amplifiers to control the conductive conditions thereof. For this purpose the amplifier 11 shown in the lower left-hand arm of the bridge network is connected to one of the outputs of the switching circuit 18 by means of the lead wire 20 while the adjacent amplifier 11, or the ones arranged in the lower right-hand arm of the bridge network is coupled to the other bistable output means or the lead wire 21. The signals from the switching circuit 18 are coupled to the other amplifiers of the complementary pair of amplifiers to render them responsive to the switching pulses substantially simultaneously as its complementary amplifiers by means of the lead wire identified as the lead wire 22 coupled to the terminal 17 to render the amplifier in the lower left-hand arm complementary with the amplifier in the upper right-hand arm of the bridge network. In the same fashion the lead wire 23 renders the amplifier in the lower right-hand arm of the bridge network complementary with the amplifier in the upper left-hand arm of the bridge network. Accordingly, it should be apparent that with the application of the direct current source 12 to the terminals 13 and 14 of the bridge network that conductive paths will be provided from the terminal 13 to the terminal 14 through, for example, the upper right-hand arm of the bridge network to terminal 16 through the load 15, the terminal 17 and the lower left-hand arm of the bridge network to the terminal 14. During the other half cycle of the resulting alternating current signal, the opposite pair of arms of the bridge network are rendered conductive providing a current through the load in the opposite direction. The signal derived between the terminals 16 and 17 and flowing through the load connected thereto is an alternating current signal having the generally square wave configuration illustrated in FIG. 1. The switching circuit 18 is defined to cause the conductive paths to be defined as described hereinabove as a result of the complementary relationship of the amplifiers 11 in the diagonally opposite arms and the repetition rate of the switching circuit 18 controls the frequency of the alternating current output from the converter.

Now referring to FIG. 2, the detailed block-circuit diagram of the converter 10 will be examined. The converter 10 as illustrated in FIG. 2 is a completely solid state circuit and the transistors illustrated therein are illustrated as NPN transistors. Accordingly, in order to render the diagonally opposite amplifier 11 complementary, the amplifiers corresponding to the amplifiers arranged in the upper arms of the bridge network are provided with pre-amplifiers, or driver circuits. It should be recognized that these pre-amplifiers circuits can be omitted if a complementary pair of transistors are employed, namely PNP and NPN. For the purposes of the present invention as illustrated in FIG. 2, the amplifiers 11 employ the pre-amplifiers and the transistor amplifiers are defined as the NPN transistors. It will also be recognized by those skilled in the art that the NPN transistors are commercially available for use in current conversion circuits at relatively high power levels for energizing 60 cycle motors.

The direct current source 12 may comprise the 400 cycle alternating current source 30 coupled to a full wave rectifier 31 to provide the direct current to the bridge network. The upper terminal of the full wave rectifier 31 is identified as the positive terminal, while the lower terminal is connected to ground and identified as the negative terminal. The switching circuit 18 comprises a controllable astable multi-vibrator 32 powered from the output of the full wave rectifier 31 through a Zener voltage divider network 33 also powering a flip flop circuit 34 coupled to be responsive to the output signals from the astable multivibrator 32. With the triggering of the flip flop 34 from the astable multi-vibrator 32 the switching signals will be provided to control the bridge network. It will be recognized that an unsymmetrical output signal is provided from the multi-vibrator 32 and a symmetrical bistable signal provided from the flip flop 34. The flip flop 34 provides the pair of bistable signals on the lead wires 20 and 21 which are coupled to the lower arms of the bridge network. The lead wire 20 is shown directly coupled to the base electrode of the transistor 35 and which transistor is arranged as a driving circuit for the associated amplifier 11 arranged in the lower left-hand arm of the bridge network. In the same fashion, the lead wire 21 is connected to a similar drive transistor 36 associated with the amplifier 11 arranged in the lower right-hand arm of the bridge network.

Each of the amplifiers 11 are essentially identical and are illustrated with drive circuits similar to the circuits including the transistors 35 and 36. In this connection, the drive circuit for the upper left-hand arm of the bridge network includes the transistor 37, while the remaining driver circuit is shown as including the transistor 38. Each of the amplifier circuits are identical and each include a pair of transistors coupled in a Darlington configuration. Only one such amplifier need be examined in detail. In examining the amplifier 11 arranged in the lower left-hand arm of the bridge network, it will be seen that it comprises a transistor 40 having its base electrode connected directly to the collector electrode for the driver transistor 35. The collector electrode for amplifier transistor 40 is connected to the collector electrode for its associated transistor 41. The emitter electrode for the transistor amplifier 40 is connected to ground by means of the dropping resistor 42. The collector electrode for the transistor 40 is coupled directly to the collector electrode for the transistor 41. The emitter electrode for the transistor 41 is connected directly to ground. The emitter electrode for the drive transistor 35 is also connected directly to ground.

The signal coupled to the drive transistor 35, then, is coupled to the complementary amplifier 11, in the upper right-hand arm of the bridge network, by means of the lead wire 22 which is connected directly to the collector electrode for the transistor 41 by means of junction 43. The signal derived from the transistor 41 in this fashion is coupled to the base electrode for the driver 38 through a dropping resistor 44 to cause the associated amplifier 11 to be rendered conductive and nonconductive substantially simultaneously with the switching of the conductive condition of its associated complementary amplifier. In the same fashion, the bistable output signals appearing on the lead wire 21 are coupled to the drive transistor 36 and its associated amplifier 11. The associated amplifier 11 comprises the transistors 45 and 46 arranged in the Darlington configuration. The output signals from the transistor 46 are coupled to its associated complementary amplifier by means of the lead wire 23 connected to the junction 47 and through the dropping resistor 48 to the driver amplifier 37. The Darlington amplifier 11 for the upper right-hand arm of the bridge network comprises the transistors 50 and 51. The amplifier 11 arranged in the upper left-hand arm of the bridge network is defined by the circuit including the transistors 52 and 53. The output terminals 16 and 17 or the load terminals are connected to the remaining diagonally opposite terminals of the bridge network, as illustrated.

In view of the above structure and explanation, the operation of the converter circuit should be readily apparent. In any event, with the application of the direct current signals to the bridge network from the rectifier 31 the converter will be rendered operable. The switching pulses are derived from the flip flop 34 at the lead wires 20 and 21 at a frequency rate controlled by the frequency rate of the astable multi-vibrator 32. The rate of the multi-vibrator 32 is controlled to provide the desired output frequency for the alternating current derived at the load terminals 16 and 17. With this circuit condition prevailing, then, and assuming that the signal on the lead wire 20 is in an "on" state, while the corresponding signal on the lead wire 21 is in the "off" state, the transistor driver 35 will be rendered conductive, while the transistor driver 36 will be rendered nonconductive. Accordingly, the transistors 40 and 41 and their complementary pair of transistors 50 and 51 will provide the conductive path from the positive terminal 31 to the bridge network to the negative terminal through the load. At the termination of this pulse period the opposite states will prevail on the lead wires 20 and 21 and accordingly the conductive conditions of the driver transistors 35 and 36 and their associated amplifiers will be reversed. During this interval the conductive path from the terminal 13 will be defined by the Darlington amplifiers 52 and 53 and 45 and 46 to cause the current to flow through the load terminal 16 and 17 in the opposite direction from that in which it had previously flowed. Of course, upon successive reversals of the flip flop 34 the amplifiers 11 will again be switched to provide the continuous alternating current output having a wave form similar to that illustrated in FIG. 1.

It should now be apparent to those skilled in the art that the present invention provides an improved, all solid state, direct current to alternating current conversion circuit.

What is claimed is:

1. In a direct current to alternating current converter including a bridge network having at least two switchable transistor power amplifiers connected in each arm of the network and arranged in a Darlington configuration, the amplifiers arranged in diagonally opposite arms being connected in a complementary fashion to be rendered conductive substantially simultaneously in response to a switching pulse applied to at least one of the complementary pair, a source of direct current connected to a diagonally opposite pair of terminals of the bridge network, means for connecting a load across the other pair of diagonally opposite terminals of the network, a source of bistable switching pulses connected to at least one of the amplifiers of the complementary pair to cause the amplifiers of each complementary pair to alternately conduct for providing an alternating current to flow through the load connected to the load terminals.

2. In a direct current to alternating current converter as defined in claim 1 wherein the complementary pair of transistors each comprise a PNP and NPN transistor arranged in a complementary fashion to be responsive to a switching pulse applied to one of the transistor amplifiers.

3. In a direct current to alternating current converter as defined in claim 1 wherein the source of bistable switching pulses includes a controllable astable multi-vibrator.

4. In a direct current to alternating current converter as defined in claim 3 including circuit means for providing a symmetrical pattern of bistable pulses.

5. In a direct current to alternating current converter including a bridge network having at least two switchable transistor power amplifiers connected in each arm of the network and arranged in a Darlington configuration, the amplifiers arranged in diagonally opposite arms being connected in a complementary fashion to be rendered conductive substantially simultaneously in response to a switching pulse applied to at least one of the complementary pair, said transistors being NPN transistors and one of the complementary pair includes a driver connected to be responsive to the conductive condition of the other transistor amplifier of the same complementary pair, a source of direct current connected to a diagonally opposite pair of terminals of the bridge network, means for connecting a load across the other pair of diagonally opposite terminals of the network, a source of bistable switching pulses connected to at least one of the amplifiers of the complementary pair to cause the amplifiers of each complementary pair to alternately conduct for providing an alternating current to flow through the load connected to the load terminals.

References Cited

UNITED STATES PATENTS

| | | | |
|---|---|---|---|
| 2,821,639 | 1/1958 | Bright et al. | |
| 2,972,710 | 2/1961 | D'Amico | 317—148.5 |
| 3,080,534 | 3/1963 | Paynter | 331—113 |
| 3,105,944 | 10/1963 | Lostetter | 321—45 XR |
| 3,177,422 | 4/1965 | Schlereth | 321—45 |
| 3,233,161 | 2/1966 | Sikorra | 321—45 XR |
| 3,260,963 | 7/1966 | Relation et al. | 331—113 |
| 3,328,667 | 6/1967 | Shaneman | 321—45 |

JOHN F. COUCH, *Primary Examiner.*

W. M. SHOOP, JR., *Assistant Examiner.*

U.S. Cl. X.R.

331—113